UNITED STATES PATENT OFFICE.

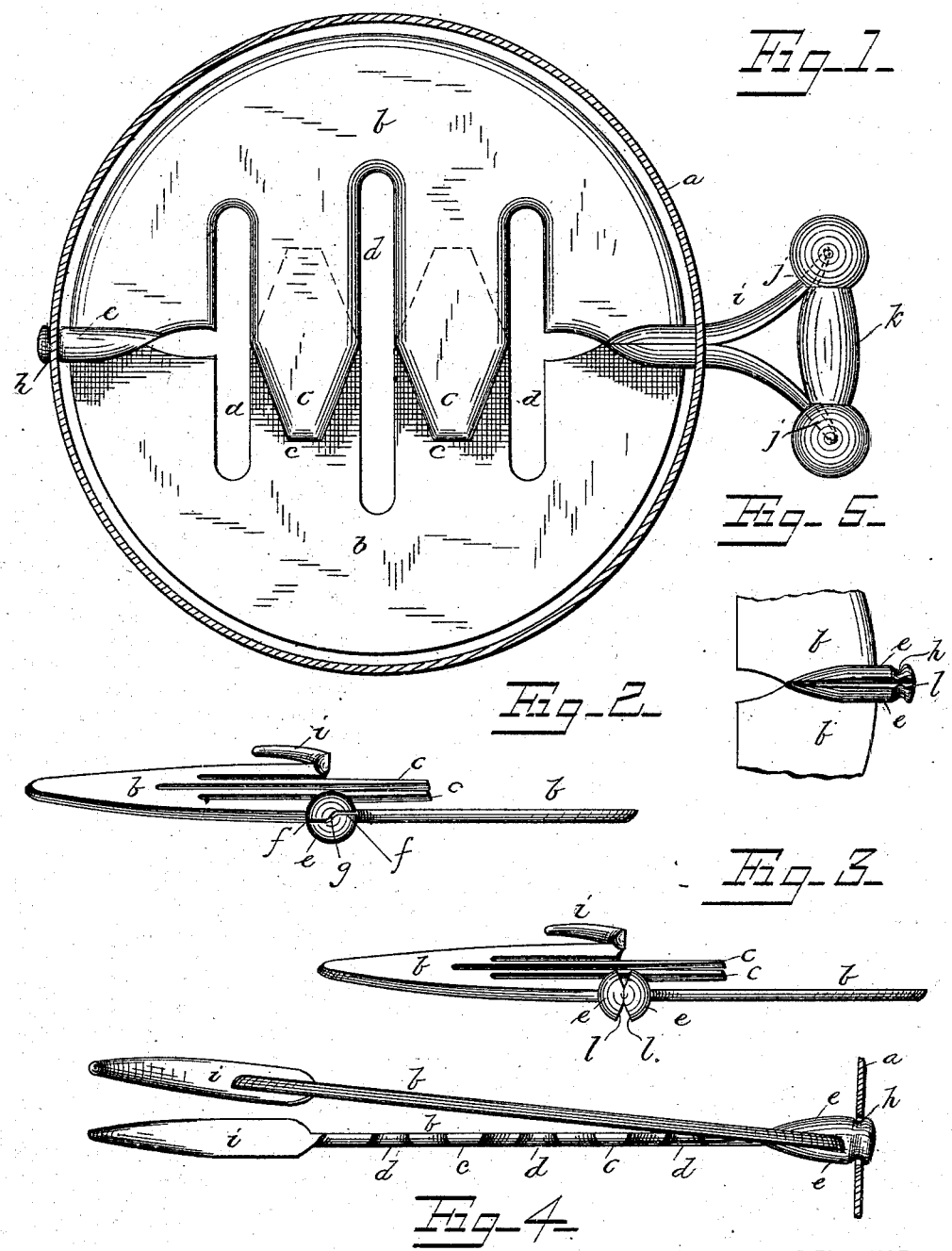

MARVIN EUGENE WELLER, OF FORT PLAIN, NEW YORK.

STOVE-DAMPER.

SPECIFICATION forming part of Letters Patent No. 274,238, dated March 20, 1883.

Application filed January 26, 1883. (No model.)

*To all whom it may concern:*

Be it known that I, MARVIN EUGENE WELLER, a citizen of the United States, residing at Fort Plain, in the county of Montgomery and State of New York, have invented certain new and useful Improvements in Dampers for Stoves, of which the following is a full, clear, and exact description.

This invention relates more particularly to dampers for use in stoves or other heating apparatus, or in the pipes thereof; and the invention consists, as hereinafter specified and claimed, first, in making a two-part damper of identical halves, whereby only one pattern and mold is necessary in their manufacture; second, in providing such halves with end lugs which match in such way that when the halves are arranged in the pipe a certain amount of spring is obtained, whereby the damper is held in the pipe in any position in which it may be turned without the use of other or extraneous springs; third, in utilizing such lugs as journals, taking the place of a spindle for the damper; fourth, in further utilizing the lug at one end of each half as means for securing a handle; and, fifth, in a damper composed of identical halves, provided with axial lugs and placed back to back in a smoke-flue, the lugs at one end serving as a journal, and the lugs at the opposite end serving also as a journal, and, additionally, as a handle-receiving device.

In the accompanying drawings, in the several figures of which like parts are similarly designated, Figure 1 is a top plan view of one form of my invention as applied in a section of stove-pipe. Fig. 2 is an edge elevation thereof when removed from the pipe, and looking from left to right of Fig. 1, the handle being removed. Fig. 3 is a similar view of a different form of journal. Fig. 4 is a side elevation of the damper, and Fig. 5 is a plan view of the journal end of the form shown in Fig. 3.

The stove-pipe, collar, or other flue, *a*, is of usual construction, having holes at opposite points therein to receive the journals of the damper.

As hereinbefore stated, my damper is composed of identical halves, so as to facilitate molding and casting, and thus lessen the cost of production, and each half *b* is of the shape, size, and arrangement necessary for the use to which the damper is to be applied; and without thereby limiting my invention to the exact details shown in the drawings, I will proceed to describe the same with reference to said drawings. Each half *b*, then, is discous and semicircular, provided with fingers *c*, which extend beyond the axial line, so that when the two halves are laid together back to back the fingers will overlap each other, to give strength and unity, and provided with slots *d*, which alternate with said fingers when such slots are desirable for the usual purpose. At one end of the axial line the half is provided with a lug, *e*, extending beyond the periphery, the under side of such lug having parallel horizontal surfaces *f f*, connected by an inclined surface, *g*, (see Fig. 2,) so that when two halves are placed together lug to lug and back to back, as shown, the opposite surfaces *f f* and *g* of the two lugs *e* will lie close together and the connected lugs will present a practically continuous periphery, affording a substantially solid journal for the damper, and giving it a large bearing and wearing surface in the hole in the pipe. The outer end of the lug *e* may be grooved, as at *h*, to insure the stability of the journal in the pipe-hole.

Each half *b* is provided at the opposite end of its axial line with a lug, *i*, projecting in a curve outwardly beyond and back from the periphery, and suitably pointed; and in inserting the halves of the damper in the pipe, as hereinafter explained, the ends of the lugs *i* enter endwardly-inclined holes *j* in opposite ends of a handle-piece, *k*, to hold it in place. The lugs *i* serve as the journal for the damper in their end of the pipe, and said lugs *i* and lugs *e* take the place of a spindle for the damper. The handle *k* is of non-conducting material, such as wood.

Instead of making the faces *f f g* on the lug *e*, I may make said lug's face as a cone or truncated cone, *l*, Figs. 3 and 5, so that when said lugs are opposed they fit as upon knife-edges; or the face of the lug may have a knob thereupon. (Not shown.) The object in these peculiarities of construction of the lug *e* is to cause the halves of the damper, when superposed and the lugs *e* opposed, to spring or stand apart laterally and vertically, or only vertically, so that when the damper is in place this tendency of the halves to separate will, under the influence of the confining medium of the lugs, impart a degree of springiness to the damper which will hold it in whatever position it may be turned to in the pipe, and render unnecessary the employment of extraneous springs, thus saving the cost of making and placing such springs, and avoiding the disadvantages incident to displacement and losing elasticity or temper under the heat to which they are subjected.

My damper is applied by superposing two like halves, one upon another, back to back, first having thrust their lugs $i$ $i$ through the pipe-hole therefor; and before the lugs $e$ $e$ are brought together the handle $k$ is so held with respect to the lugs $i$ $i$ that as the lugs $e$ $e$ are brought together the ends of the lugs $i$ $i$ will enter the sockets $j$ $j$ in such handle, and as the lugs $e$ $e$ meet the distance between the ends of the lugs $i$ $i$ will have exceeded the distance between the mouths of the endwardly-inclined sockets or holes in said handle to such extent that the handle will be securely retained upon such lugs without riveting or other extraneous fastening. The lugs $e$ $e$ are now thrust into the hole in the pipe prepared for them, and as their tendency is to separate, or, being confined to cause the lugs $i$ $i$ to separate, there will result a degree of expansive force or spring sufficient to hold the damper in the pipe in whatever position it may be turned.

Figs. 2, 3, and 4 illustrate the positions of the halves when the lowermost, for convenience of illustration, is fixed, and the lugs $e$ $e$ of the two confined.

I have said that the halves of the damper are applied in the pipe by being superposed and introducing their lugs through the pipe-holes made to receive them, and now, to particularize, I wish to say each half is introduced separately by projecting its lug $i$ through its hole first, with one hand inside the pipe, while the other hand is outside the pipe and applies the handle $k$ thereto. The lug $e$ of that half is then introduced into its hole, and the other half superposed and similarly introduced, and the other end of the handle applied.

The advantages aimed at and obtained in my invention are, first, the reduction of cost of production, by reason of the halves being identical and cast from one mold; second, the dispensing with a spindle; third, the facility of applying the handle; fourth, the simplicity of the damper as a whole; fifth, the facility of packing for transportation; and, sixth, the replacing of a broken half without buying an entirely new damper.

I may here remark that it is not new to provide a damper with spindle-lugs which spring apart when unconfined, owing to the parts of the damper being united by a spring integral with said parts, and in such a damper the opposite end lug is in one solid piece.

What I claim is—

1. A damper composed of halves cast from the same pattern and fitted one to the other, back to back, as shown, and provided with integral means for securing the same in a pipe, substantially as described.

2. The combination, in a damper, of halves provided with axial lugs at one end, constructed with meeting faces, as specified, tending, when confined, to separate the halves laterally or vertically, or both, and also provided with lugs at the other end of the axial line, which, when confined, are acted upon by the separating tendency of the other lugs to cause an elastic binding of the damper in the pipe to hold such damper in the position in which it may be turned, substantially as described.

3. The combination, in a damper, of halves adapted to be placed back to back, and provided with end lugs forming a journal or spindle therefor, substantially as shown and described.

4. The combination, in a damper, of halves provided with journal-lugs $i$ $i$ to receive and hold the handle, substantially as described.

5. The combination, in a damper, of halves provided with lugs $e$, having the meeting faces $f$ $f$ $g$, substantially as shown and described.

6. The combination, in a damper, of halves, substantially as shown, cast from the same pattern and provided with axial lugs, and placed back to back in a smoke-flue, the lugs at one end serving as a journal, and the lugs at the opposite ends also serving as a journal and, additionally, as a handle-receiving device, substantially as described.

7. The combination, in a damper, of halves, as set forth, provided with journals at each end of an axial line, the journal at one such end being curved, as shown, combined with a handle-piece engaged by the ends of such curved journal, substantially as shown and described.

8. The damper-half $b$, provided with the lug $e$ and the curved lug $i$, substantially as shown and described.

9. The damper-half $b$, provided with fingers $c$, projecting beyond an axial line, and the lugs $e$ and $i$ at opposite ends of such axial line, substantially as described.

In testimony whereof I have hereunto set my hand this 24th day of January, A. D. 1883.

MARVIN EUGENE WELLER.

Witnesses:
J. S. YOST,
L. M. WELLER.